United States Patent [19]

Hata

[11] Patent Number: 4,708,363
[45] Date of Patent: Nov. 24, 1987

[54] MECHANISM FOR LIMITING ANGULAR MOVEMENT IN STEERING SYSTEMS FOR MOTOR VEHICLES

[75] Inventor: Koichi Hata, Tokyo, Japan
[73] Assignee: Honda Giken Kogyo Kabushiki Kaisha, Tokyo, Japan
[21] Appl. No.: 888,734
[22] Filed: Jul. 21, 1986

[30] Foreign Application Priority Data

Jul. 19, 1985 [JP] Japan .................... 60-159732

[51] Int. Cl.$^4$ .............................................. B60G 1/00
[52] U.S. Cl. ................................. 280/771; 280/96.1; 280/675
[58] Field of Search .................. 280/771, 95 R, 96.1, 280/94, 774, 675

[56] References Cited

U.S. PATENT DOCUMENTS

| | | | |
|---|---|---|---|
| 3,039,831 | 6/1982 | Thomas | 280/96.1 |
| 3,161,419 | 12/1964 | Schaaf | 280/96.1 |
| 3,749,415 | 7/1973 | Sampataros | 280/96.1 |
| 3,966,220 | 6/1976 | Forsyth et al. | 280/771 |
| 4,161,327 | 7/1979 | Honecker | 280/771 |
| 4,273,356 | 6/1981 | Sakata et al. | 280/675 |
| 4,591,184 | 5/1986 | Matschinsky | 280/675 |

Primary Examiner—Richard A. Bertsch
Attorney, Agent, or Firm—Irving M. Weiner; Joseph P. Carrier; Pamela S. Burt

[57] ABSTRACT

An angular movement limiting mechanism is incorporated in a steering system for a motor vehicle includes a steering handle, a pair of steerable wheels, a pair of knuckles on which the steerable wheels are rotatably supported, a pair of knuckle supporting members on which the knuckles are angularly movably supported, and a pair of tie rods operatively coupled between the steering handle and the knuckles for transmitting angular movement of the steering handle to the knuckles. The angular movement limiting mechanism comprises a pair of stoppers mounted on the knuckle supporting members, respectively, and engageable with the knuckles, respectively, for limiting angular movement of the knuckles. The stoppers and the knuckles are relatively positioned such that when the steering handle is turned through a maximum angle, there is a clearance kept between the knuckle coupled to the tie rod being pushed and the stopper associated therewith.

2 Claims, 4 Drawing Figures

MECHANISM FOR LIMITING ANGULAR MOVEMENT IN STEERING SYSTEMS FOR MOTOR VEHICLES

BACKGROUND OF THE INVENTION

1. Field of the Invention

The present invention relates to a mechanism for limiting angular movement in a steering system for a motor vehicle of the type in which a steering handlebar and the knuckles of steerable wheels are operatively coupled by a connecting mechanism including rods.

2. Description of the Relevant Art

Steering systems for motor vehicles are generally constructed such that the angular movement of a steering handlebar is transmitted to a steering shaft to enable a link mechanism including tie rods to turn knuckles for thereby steering steerable wheels connected to the knuckles. To prevent the steerable wheels from being turned beyond a certain angular range, into physical interference with other elements, a stopper mechanism is disposed for limiting the angular movement of the steering handlebar and the knuckles to a desired angular range. The stopper mechanism has two stoppers for engagement with the knuckles, respectively.

Due to manufacturing errors and other factors, however, it is impossible for the knuckles of the steerable wheels to be brought into simultaneous abutment against the respective stoppers. With such an arrangement, when the knuckle coupled to the tie rod which is being subjected to a push engages its stopper earlier than the knuckle coupled to the tie rod which is being subjected to a pull, the steering handlebar can further be turned to a certain extent while forcibly flexing the tie rod being pushed with its knuckle in engagement with the stopper. This action undesirably prevents the driver from feeling a sufficient degree of firmness on the steering handlebar when it is turned to the limits of its steering range.

SUMMARY OF THE INVENTION

According to the present invention, there is provided a steering system for a motor vehicle, comprising a steering handle, a pair of steerable wheels, a pair of knuckles on which the steerable wheels are rotatably supported, a pair of knuckle supporting members on which the knuckles are angularly movably supported, a pair of tie rods operatively coupled between the steering handle and the knuckles for transmitting angular movement of the steering handle to the knuckles, and a pair of stoppers mounted on the knuckle supporting members, respectively, and engageable with the knuckles, respectively, for limiting angular movement of the knuckles. The stoppers and the knuckles are relatively positioned such that when the steering handle is turned through a maximum angle, there is a clearance kept between the other knuckle coupled to the tie rod being pushed and the stopper associated therewith.

Therefore, it is an object of the present invention to provide a mechanism for limiting angular movement in a steering system for a motor vehicle, which mechanism is constructed to prevent a tie rod which is being pushed from being flexed when a steering handlebar is turned through a maximum angle.

Another object of the present invention is to provide such a limiting mechanism which is capable of absorbing, to a certain extent, external forces which are applied to a wheel supported on a knuckle coupled to a tie rod being pushed by the steering system. Such external forces otherwise tend to undesirably pull the tie rod when a steering handlebar is turned through a maximum angle.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
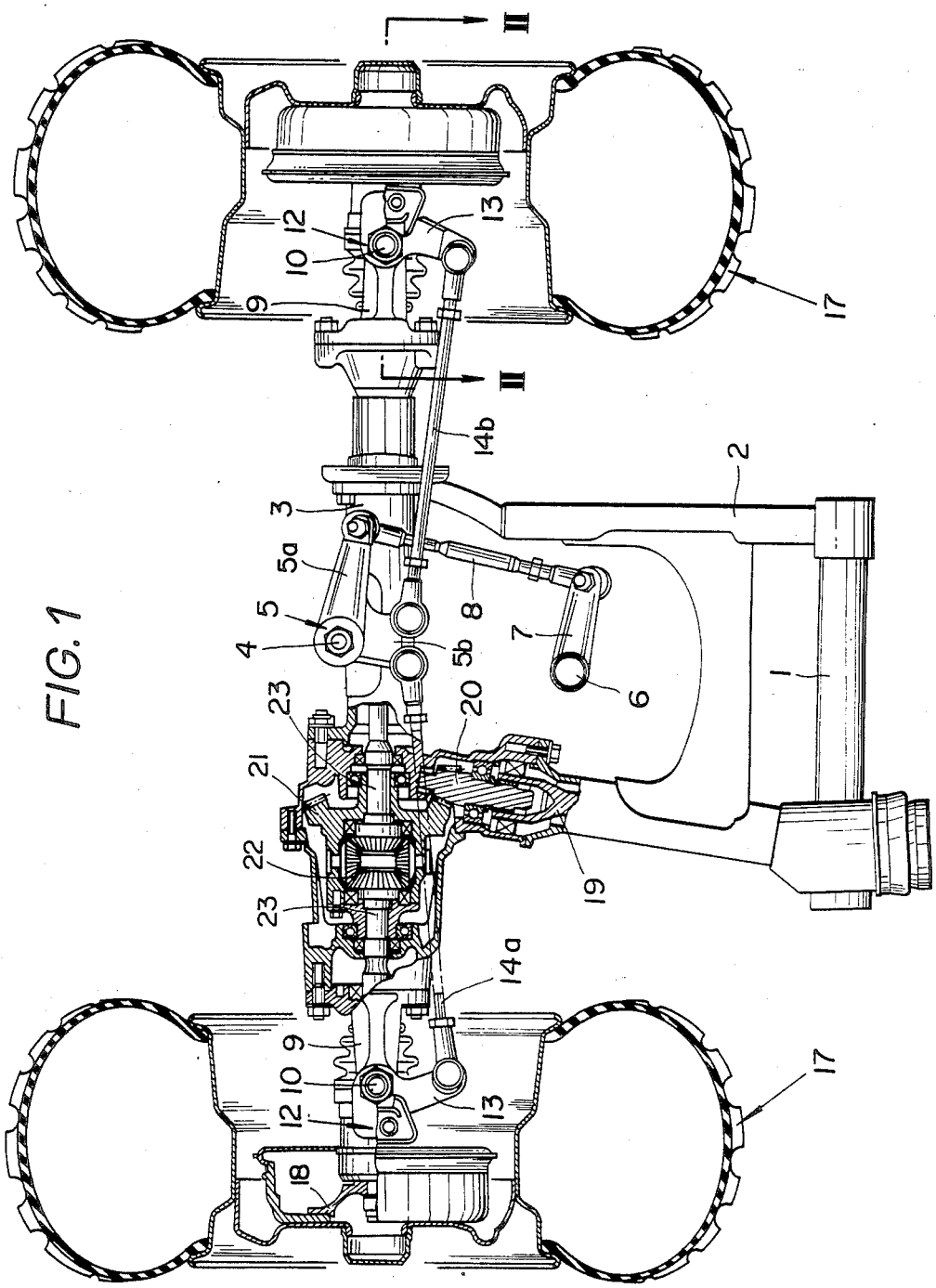
FIG. 1 is a plan view, partly in cross section, of a steering system to which an angular movement limiting mechanism according to the present invention is applicable.

FIG. 1 shows a steering system incorporated in a four-wheel buggy with a riding saddle. The buggy includes a vehicle frame 1 with a swing arm 2 being vertically swingably mounted on a front end thereof. An axle case 3 is supported on the front end of the swing arm 2. A steering pivot arm 5 is horizontally pivotally mounted by an upward pivot shaft 4 on the upper surface of a longitudinally centrally portion of the axle case 3. The pivot arm 5 comprises a lateral arm member 5a and a rear arm member 5b.

A vertically extending steering shaft 6 which is coupled to a steering handlebar (described later on) is disposed behind the steering pivot arm 5, and joined to an arm 7 that is angularly movable in a horizontal plane in unison with the steering shaft 6. The arm 7 has its distal end operatively coupled by a drag link 8 to the lateral arm member 5a of the steering pivot arm 5 so that the arm 7 and the lateral arm member 5a will be turned in the same direction.

Figure 2:
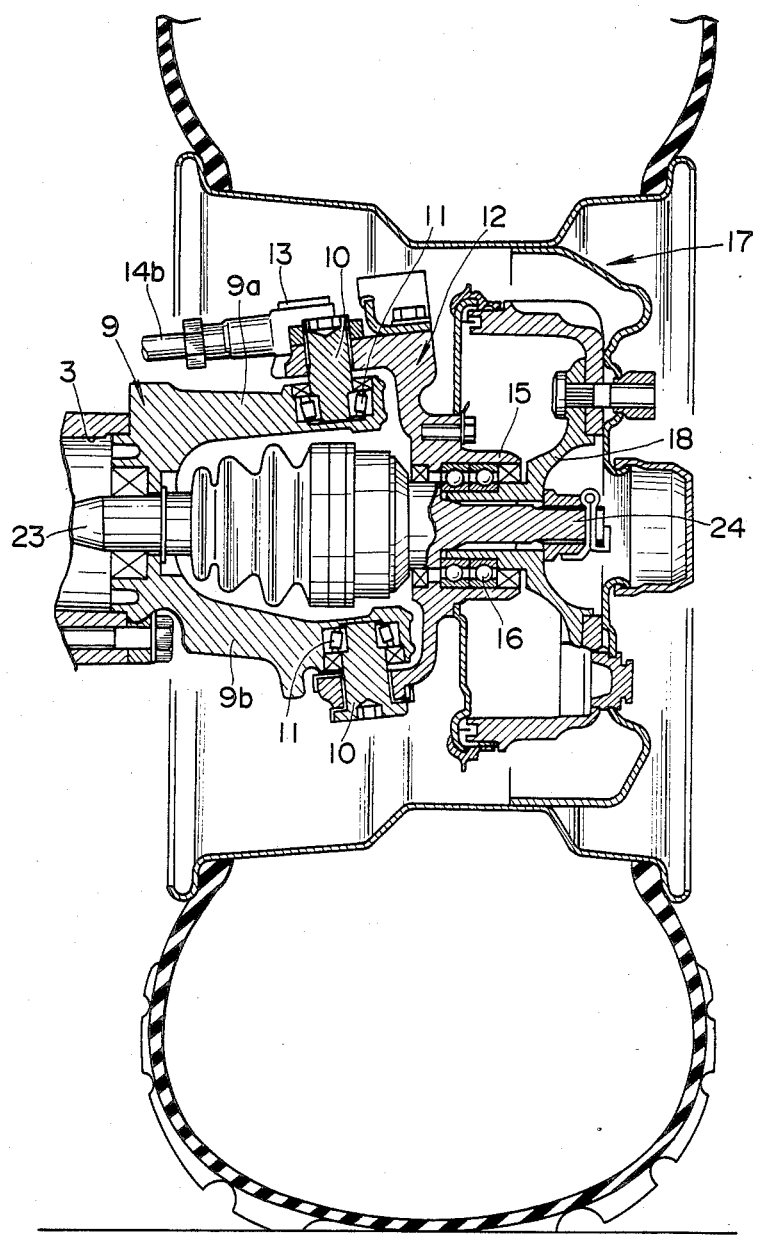
FIG. 2 is an enlarged cross-sectional view taken along line II—II of FIG. 1.

As illustrated in FIG. 2, a knuckle holder 9 is fixed to each of the opposite ends of the axle case 3 and includes upper and lower arms 9a, 9b on which a knuckle 12 is mounted by upper and lower kingpins 10 and bearings 11, having a substantially vertical common axis, for substantially horizontal angular movement about the common axis. As shown in FIG. 1, the knuckles 12 on the respective knuckle holders 9 have rear extensions 13 with rear ends thereof operatively coupled to the rear arm member 5b of the steering pivot arm 5 by tie rods 14a, 14b, respectively. As shown in FIG. 2, each of the knuckles 12 has an outwardly projecting sleeve 15 in which a hub 18 of a steerable front wheel 17 is rotatably supported by a bearing 16.

As shown in FIG. 1 the swing arm 2 is substantially aligned in parallel with a drive shaft 19, which drive shaft is operatively coupled to an axle 23, housed in the axle case 3, by a driver gear 20, a driven gear 21, and a differential gear mechanism 22. The axle 23 has outer ends each respectively extending into a corresponding knuckle holder 9 and coupled to a spindle 24 (FIG. 2) through a constant-velocity joint. The spindle 24 is splined to the inner peripheral surface of the hub 18 for driving the front wheel 17.

Figure 3:
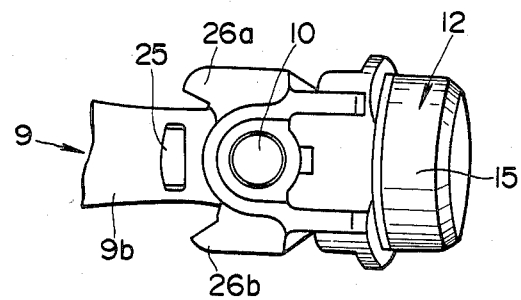
FIG. 3 is a bottom view of a knuckle holder and a knuckle, showing an angular movement limiting mechanism of the present invention.

As illustrated in FIG. 3, a stopper 25 projects donwardly from the lower surface of the lower arm 9b of the knuckle holder 9. The knuckle 12 has on its lower portion a pair of front and rear stoppers 26a, 26b positioned for engagement with the stopper 25 to limit angular movement of the knuckle 12 to a certain angular range.

Figure 4:
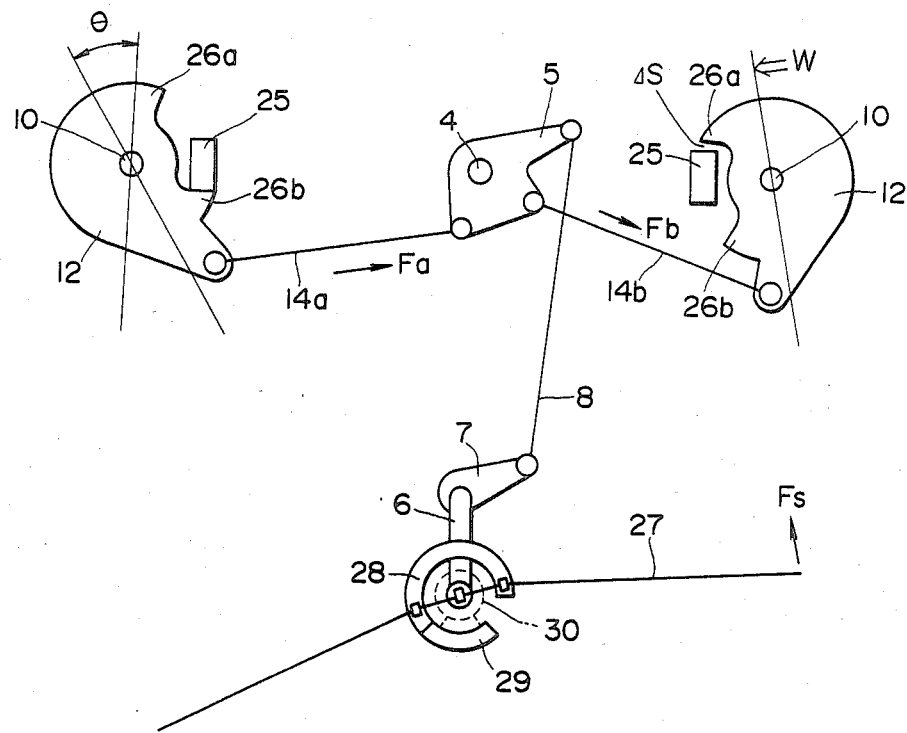
FIG. 4 is a diagrammatic plan view of a steering system incorporating an angular movement limiting mechanism of the present invention.

FIG. 4 diagrammatically shows a steering system incorporating an angular movement limiting mechanism according to the present invention. The steering shaft 6 has an upper end secured to the center of a handlebar 27 to which a stopper 28 is affixed. Another stopper 29 is secured to a head pipe 30 for abutment against the stopper 28.

The arm 7 fixed to the steering shaft 6 and the steering pivot arm 5 are operatively interconnected by the drag link 8, and the steering pivot arm 5 and the knuckles 12 are operatively interconnected by the tie rods 14a, 14b, respectively, as described above. Angular movement of the steering handlebar 27 is limited by abutting engagement between the stoppers 28, 29, whereas angular movement of the knuckles 12 is limited by abutting engagement between the stopper 25 and the stoppers 26a, 26b. When the knuckle 12 coupled to the tie rod 14a subjected to a pull, i.e., the knuckle 12 of the wheel on an inner turning circle, is held in abutment against the stopper 25, there is a small clearance ΔS kept between the knuckle 12 coupled to the tie rod 14b subjected to a push, i.e., the knuckle 12 of the wheel on an outer turning circle. Irrespective of whether the motor vehicle makes a right turn or a left turn, there is a small clearance created between the stopper 26a of the knuckle 12 on the outer wheel and the stopper 25 of the corresponding knuckle holder 9 when the stopper 26b of the knuckle 12 on the inner wheel and the stopper 25 of the corresponding knuckle holder 9 abut against each other.

If the steering handlebar 27 is turned counterclockwise as shown in FIG. 4 to make a left turn, the steering shaft 6 causes the arm 7 and the drag link 8 to turn the steering pivot arm 5 counterclockwise for thereby pulling the lefthand knuckle 12 through the tie rod 14a so that the lefthand knuckle 12 is turned counterclockwise. As the knuckles 12 are angularly moved counterclockwise, the front wheels 17 are turned to steer the motor vehicle to the left. Similarly, when the steering handlebar 27 is turned clockwise, the front wheels 17 are turned to steer the motor vehicle to the right.

When the handlebar 27 is fully turned counterclockwise under a steering force Fs, the tie rod 14a is subjected to a pulling force Fa and the lefthand knuckle 12 coupled to the tie rod 14a is angularly moved through a maximum angle θ until the rear stopper 26b thereof engages the rear edge of the lefthand stopper 25. Since the tie rod 14a will not be flexed even if the steering force Fs is continuously applied to the handlebar 27, the driver who turns the handlebar 27 feels a sufficient degree of firmness on the handlebar 27 which is now prevented from being turned further. At this time, the front stopper 26a of the righthand knuckle 12 coupled to the tie rod 14b subjected to a pushing force Fb is spaced the clearance ΔS from the front edge of the righthand stopper 25. When an external force W is imposed on the wheel 17 on the righthand knuckle 12, tending to turn the wheel 17 counterclockwise, the external force W is absorbed to a certain extent by the clearance ΔS, after which the front stopper 26a of the righthand knuckle 12 is brought into abutting engagement with the righthand stopper 25. Therefore, any adverse effects which the application of such an external force W has on the steering system can be held to a minimum.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A steering system for a motor vehicle, comprising:
a steering handle;
a pair of steerable wheels;
a pair of knuckles on which said steerable wheels are rotatably supported, each said knuckle having a pair of front and rear stopper portions;
a pair of knuckle supporting members on which said knuckles are angularly movably supported;
a pair of tie rods operatively coupled between said steering handle and said knuckles for transmitting angular movement of said steering handle to said knuckles;
a pair of stoppers mounted on said knuckle supporting members, respectively, and engageable with said stopper portions of said knuckles, respectively, for limiting angular movement of said knuckles; and
said stopper and said knuckles being relatively positioned such that when said steering handle is turned through a maximum angle, there is a clearance kept between the knuckle coupled to the tie rod being pushed and the stopper associated therewith.

2. A steering system for a motor vehicle, comprising:
a steering handle;
a pair of steerable wheels;
a pair of knuckles on which said steerable wheels are rotatably supported, each said knuckle having a pair of front and rear stopper portions;
a pair of members with respect to which said knuckles are angularly movable;
a pair of tie rods operatively coupled between said steering handle and said knuckles for transmitting angular movement of said steering handle to said knuckles;
a pair of stoppers mounted on said members, respectively, and engageable with said stopper portions of said knuckles, respectively, for limiting angular movement of said knuckles; and
said stoppers and said knuckles being relatively positioned such that when said steering handle is turned through a maximum angle, one of said knuckles which is coupled to the tie rod that is pulled is brought into abutment against the stopper associated therewith earlier than the other knuckle abuts against the stopper associated therewith.

* * * * *